(12) United States Patent
Stevenson et al.

(10) Patent No.: US 10,252,477 B2
(45) Date of Patent: Apr. 9, 2019

(54) MECHANICAL ASSEMBLY HOUSING

(75) Inventors: James F. Stevenson, Morristown, NJ (US); Douglas J. Steinke, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 2834 days.

(21) Appl. No.: 12/548,284

(22) Filed: Aug. 26, 2009

(65) Prior Publication Data

US 2011/0048868 A1 Mar. 3, 2011

(51) Int. Cl.
*B29C 70/34* (2006.01)
*B29C 70/86* (2006.01)
*F16D 55/00* (2006.01)
*F16D 55/36* (2006.01)
*F16D 125/04* (2012.01)
(Continued)

(52) U.S. Cl.
CPC ............ *B29C 70/347* (2013.01); *B29C 70/86* (2013.01); *F16D 55/36* (2013.01); *F16D 2055/0091* (2013.01); *F16D 2125/04* (2013.01); *F16D 2200/006* (2013.01); *F16D 2200/0034* (2013.01); *F16D 2250/00* (2013.01); *F16D 2250/0092* (2013.01); *Y10T 74/2186* (2015.01); *Y10T 156/10* (2015.01)

(58) Field of Classification Search
CPC .......... F16D 55/00; B29C 70/68; B65H 81/00
USPC ........ 188/71.1, 73.32, 18 A, 72.8, 162, 71.3, 188/218 A, 264 W, 72.1, 166; D12/180; 244/11, 111; 156/60; 74/606 R
See application file for complete search history.

(56) References Cited

U.S. PATENT DOCUMENTS 3,765,979 A * 10/1973 Thomas .................. B29C 53/76
156/173
4,360,083 A * 11/1982 Weisman ................ B60T 1/065
188/18 A
(Continued)

FOREIGN PATENT DOCUMENTS

EP 1 956 261 A2 8/2008
WO WO 01/64570 A1 9/2001
WO 2003/100260 A2 12/2003

OTHER PUBLICATIONS

Examination Report dated Sep. 11, 2012, for counterpart EP Application No. 10 172 209.8, 6 pages.
(Continued)

*Primary Examiner* — Robert A. Siconolfi
*Assistant Examiner* — San Aung
(74) *Attorney, Agent, or Firm* — Shumaker & Sieffert, P.A.

(57) ABSTRACT

An apparatus (10) that houses functional components of a mechanical assembly includes a frame component (12) formed of a first material, the frame component (12) bearing primary load, torque or pressure applied to the apparatus (10) during operation of said mechanical assembly. The housing apparatus (10) further includes a composite reinforcement component (130) for resisting forces applied to the apparatus during operation of the mechanical assembly and an enclosure component (80) formed of a second material of lower density than the first material of the frame component (12), the enclosure component (80) covering and sealing at least the functional components of the mechanical assembly from external conditions during operation of the mechanical assembly.

16 Claims, 6 Drawing Sheets

(51) Int. Cl.
*F16H 57/02* (2012.01)
*B29C 65/00* (2006.01)

(56) References Cited

U.S. PATENT DOCUMENTS

| | | | | |
|---|---|---|---|---|
| 4,395,195 A * | 7/1983 | De Cosmo | | F01D 9/042 |
| | | | | 415/137 |
| 4,460,531 A * | 7/1984 | Harris | | B29C 70/347 |
| | | | | 156/173 |
| 5,376,199 A * | 12/1994 | Humphrey | | B29C 53/14 |
| | | | | 156/172 |
| 5,385,421 A | 1/1995 | Morgan et al. | | |
| 5,429,477 A * | 7/1995 | Sikorski | | F01D 21/045 |
| | | | | 415/119 |
| 5,545,118 A * | 8/1996 | Romanauskas | | B04B 5/0414 |
| | | | | 464/180 |
| 5,878,849 A | 3/1999 | Prunier, Jr. et al. | | |
| 6,324,940 B1 * | 12/2001 | Pazdirek | | B29C 53/585 |
| | | | | 174/47 |
| 6,796,406 B1 * | 9/2004 | Yunes | | F16D 55/02 |
| | | | | 188/218 A |
| 7,717,240 B2 * | 5/2010 | Anderson | | B60T 13/741 |
| | | | | 188/156 |
| 2005/0104441 A1 * | 5/2005 | Bertelson | | B29C 70/345 |
| | | | | 301/64.703 |
| 2007/0193836 A1 * | 8/2007 | Walker | | F16D 65/126 |
| | | | | 188/218 XL |
| 2007/0199403 A1 * | 8/2007 | Ciavatta | | B62M 3/00 |
| | | | | 74/594.1 |
| 2008/0191092 A1 * | 8/2008 | Steinke | | F16D 65/14 |
| | | | | 244/111 |
| 2009/0117322 A1 * | 5/2009 | Larsen | | B32B 33/00 |
| | | | | 428/137 |
| 2010/0143661 A1 * | 6/2010 | Warrick | | B32B 5/18 |
| | | | | 428/174 |

OTHER PUBLICATIONS

European Search Report dated Aug. 28, 2012, for counterpart EP Application No. 10 172 209.8, 3 pages.
Examination Report from counterpart EP Application No. 10 172 209.8 dated Nov. 1, 2013. 4pp.
Reply to communication from the Examining Division, for counterpart EP Application No. 10172209.8, filed Jan. 9, 2013, 18 pages.
Response to Examination Report dated Nov. 1, 2013, from counterpart European application No. 10172209.8, filed Mar. 18, 2014, 12 pp.

* cited by examiner

MECHANICAL ASSEMBLY HOUSING

FIELD OF THE INVENTION

The present invention is directed toward a composite structural housing of a mechanical assembly with a portion serving an enclosure function to separate internal and external operating environments and a second portion serving a structural function to support or transmit local loads or resist pressure. In one implementation, the present invention is directed toward a composite housing for aircraft brake pistons.

BACKGROUND OF THE INVENTION

Many housings for mechanical equipment are required to serve two generally different functions: (1) to enclose the internal components of the assembly to prevent any undesired exchange to or from the external environment; and (2) to handle large forces, torques or pressures generated internally among equipment components or transmitted to or from an external source through the housing wall.

With a conventional metal housing, both the enclosure and load bearing functions are handled by locally changing the metal from thick (load bearing) to thin (separation) by shaping the housing as a whole during manufacture. Manufacture may be by casting, forging, machining, or some other method. Generally a metal housing has a uniform composition with mechanical properties being uniform in all directions (isotropic).

Composite materials offer a much greater range of materials and properties including properties that are highly directional (anisotropic). Properties and cost are highly dependent on material variables and method of manufacture. Manufacture of composite structures by placement of plies of material leads to very strong, stiff, and light weight structures which may be very expensive, especially for hand layup. Structures made of metals can also be very strong and stiff, but tend to be heavy and in some cases prone to corrosion. Conversely lower cost composite manufacturing processes, such as molding or stamping, generally employ short fibers and do not control fiber orientation. These processes give structures with lower mechanical properties. Generally composite materials are less prone to corrosion than metals.

In the past, attempts to reduce weight and to meet structural requirements by fabricating an enclosure by a single high performance manufacturing process, for example hand layup, have resulted in high manufacturing costs and the decision not to convert to composites.

SUMMARY OF THE INVENTION

These and other problems are addressed by the present invention, a first aspect of which comprises an apparatus that houses functional components of a mechanical assembly comprising: a frame component formed of a first material, the frame component bearing primary load, torque or pressure applied to the apparatus during operation of the mechanical assembly; a composite reinforcement component for resisting forces applied to the apparatus during operation of the mechanical assembly; and an enclosure component formed of a second material of lower density than the first material of the frame component, the enclosure component covering and sealing the functional components of the mechanical assembly from external conditions during operation of the mechanical assembly.

Another aspect of the present invention comprises a method of manufacturing an apparatus that houses functional components of an mechanical assembly comprising: providing a frame component formed of a first material, the frame component being configured for bearing primary load, torque or pressure to be applied to the apparatus during operation of the mechanical assembly; providing a composite reinforcement component for resisting force applied to the apparatus during operation of the mechanical assembly; and forming an enclosure component of a second material of lower density than the first material of the frame component, the enclosure component being formed to cover and seal the functional components of the mechanical assembly from external conditions that occur during operation of the mechanical assembly.

Yet another aspect of the present invention comprises an aircraft brake piston housing that includes an internal frame that includes a plurality of circumferentially disposed openings surrounding a central bore. The frame is supported by a series of windings winding circumferentially around the central bore and at least one of the circumferentially disposed openings. A cover encases the supported frame, and is made of material different than the frame.

BRIEF DESCRIPTION OF THE DRAWINGS

These and other aspects and features of embodiments of the present invention will be better understood after a reading of the following detailed description in connection with the attached drawings wherein.

DETAILED DESCRIPTION

Embodiments of the present invention described herein address the issues described above by separating the enclosure and load bearing requirements of an aircraft assembly housing and generally providing two or more sets of materials, structures, and processes that in combination meet the performance requirements in an economic way. Although aspects of the invention are described in detail below with reference to an aircraft brake piston housing, it should be recognized that the present invention is applicable to other mechanical assemblies such as gear boxes, transmission housings, and motor housings.

Figure 1A:
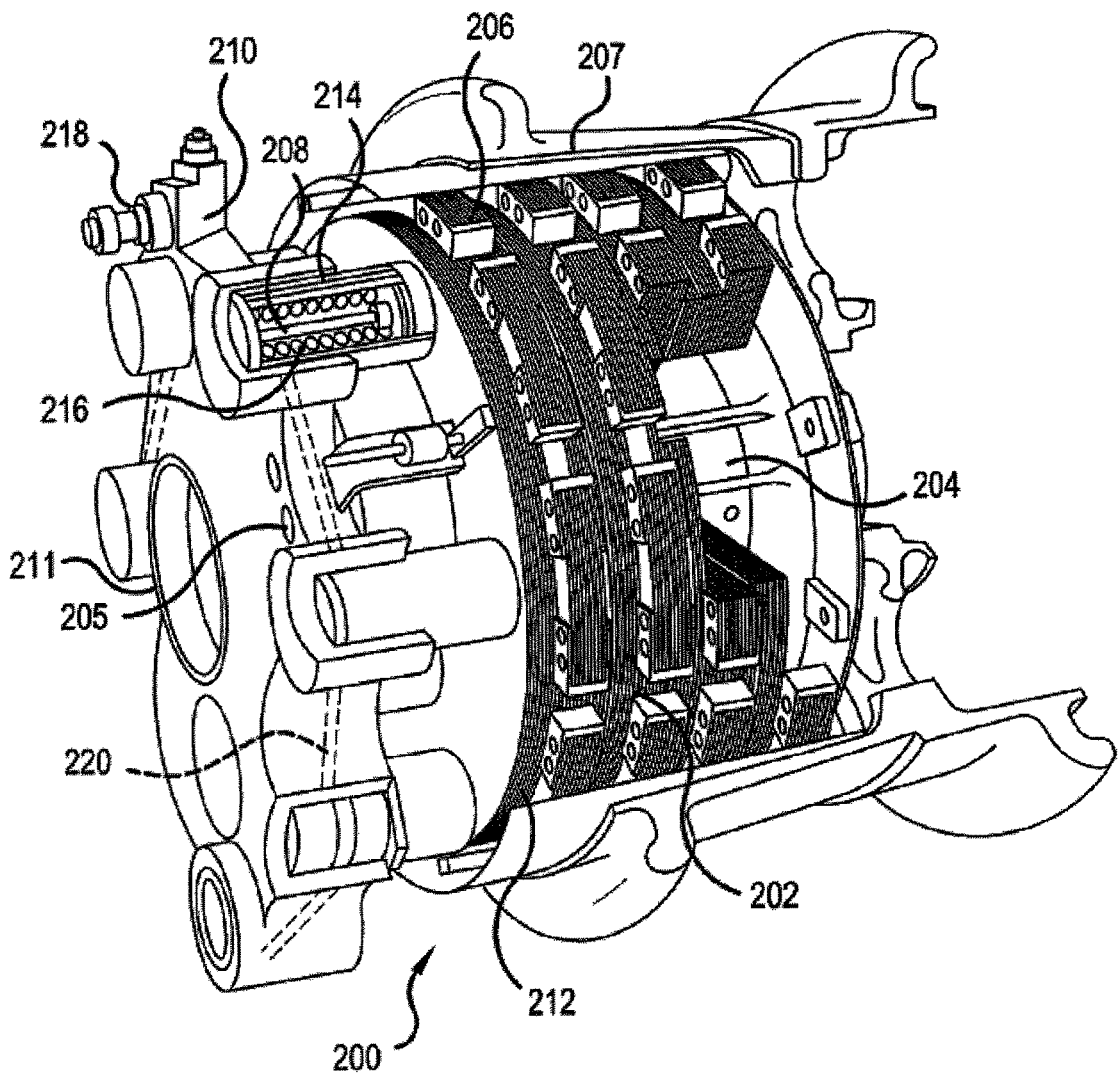
FIG. 1A is a perspective view of a portion of an aircraft brake having a conventional brake piston housing.

Referring now to the drawings, wherein the showings are for purposes of illustrating embodiments of the invention only and not for the purpose of limiting same, FIG. 1A illustrates a portion of a typical aircraft brake system 200 that includes a plurality of spaced, disk shaped stators 202 mounted on a torque tube 204 and a plurality of disk shaped rotors 206 that rotate with an aircraft wheel 207 and extend into the spaces between the stators 202. Pistons 208 are mounted on a piston housing 210 which is connected to the torque tube 204 by bolts 205. The pistons 208 apply pressure against a pressure plate 212 (the first stator in the stack of rotors and stators) to compress the stack, and the friction generated as the rotors are pressed into contact with the stators slows the aircraft wheel.

Each of the pistons 208 is mounted in a piston chamber 214 and biased into a retracted position relative to pressure plate 212 with springs 216. Hydraulic fluid flows into piston housing 210 through fitting 218 and into internal channels 220 formed in the aluminum piston housing 210 containing central bore 211 between the piston chambers 214. Thus, when pressure is applied to the fluid by an external source, (not shown) the pistons 208 are driven against the pressure plate 212; when the hydraulic pressure drops, the pistons 208 are retracted by springs 216.

Brake assemblies are subject to high temperatures and stresses. The rotors and stators can reach 1500° F. during a landing and the hydraulic fluid pressure in the piston chambers and connecting hydraulic fluid lines can reach thousands of psi. Moreover, it is desirable to provide a suitably rigid piston housing because deformations of the piston housing can misalign the pistons 208 and piston chambers 214 and cause the pistons to bind, hydraulic fluid to leak, and/or the brake system to operate improperly.

Figure 1B:
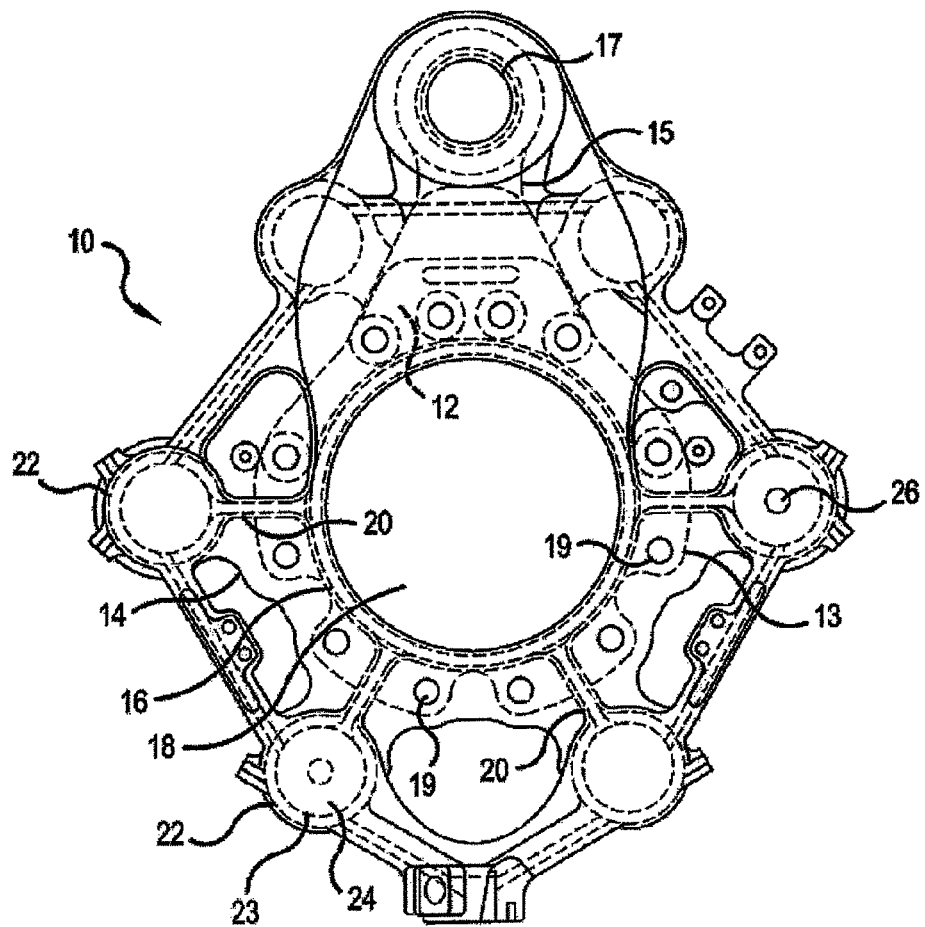
FIG. 1B illustrates an aircraft brake piston housing including a frame embedded in a composite body according to an embodiment of the present invention.

FIG. 1B illustrates a brake piston housing 10 comprising a frame 12 embedded in a body 14 formed of a composite material according to an embodiment of the present invention. In one implementation, frame 12 is comprised of high-strength metal, such as stainless steel or titanium. Frame 12 includes a central body portion 16 defining a central opening 18, a plurality of bolt holes 19; at least one torque arm 15 with torque arm attachment 17, and a plurality of arms 20 extending from the central body portion 16 which arms terminate in rings or ring members 22. The rings 22 define openings 23 adapted to receive piston chamber inserts 24 which in turn contain a brake piston 26 and a tension spring that holds piston 26 in a retracted position within cylindrical insert 24 under normal circumstances. The structures of rings 22 define the piston cylinders of the brake piston housing.

In designing a housing which functions as a structural enclosure, the forces and torques are determined between various locations in the housing and pressures are noted. In many cases those forces and torques that represent tensile or compressive forces between two locations within the housing can be resisted by windings of fibers or fiber tapes (tensile) or laminate block inserts (compression) between the locations. The fibers, which may or may not be coated with resin, are particularly capable of resisting tensile loads but are not as able to resist compression. If fibers extend appropriately in various directions around a component, any motion by the component may be resisted by the tension in certain fibers even though other fibers will be in compression. Composite laminates, for example consisting of fabric layup with holes for attachment, are not as effective on a weight basis as fiber windings in resisting tension forces between locations. Conversely, compressive forces can be resisted by relatively thick laminated composite structures where the thick cross-section resists buckling. These laminate structures may include honeycomb or rigid foam layers. Fiber windings in combination with thick laminate blocks are effective between points experiencing both tension and compression. The fibers may be any of the various grades of carbon, glass or ceramic fibers that are well known in the art. The resins may be epoxy, bismaleimide, polyimide or others resins commonly using in composite applications.

Figure 2:
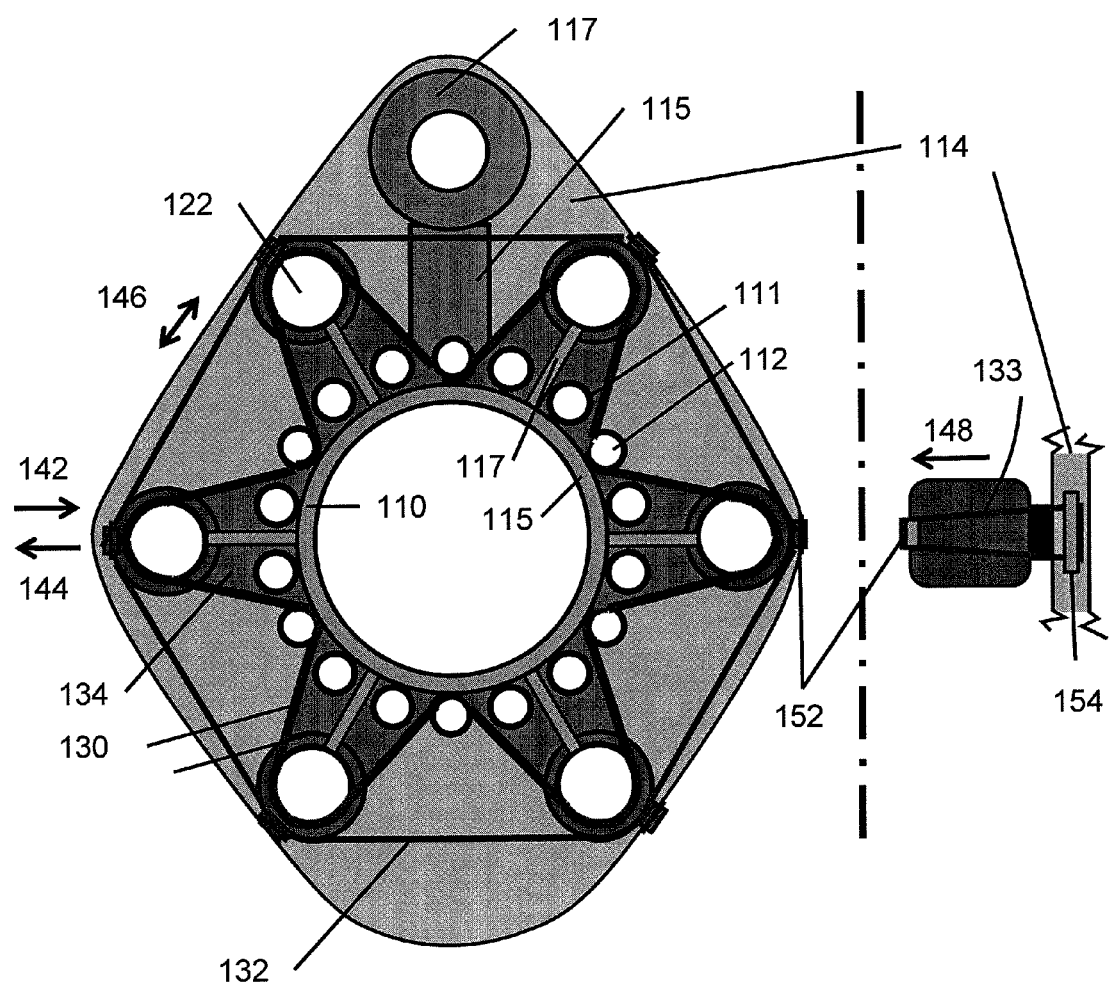
FIG. 2 illustrates a top view and partial side view the interior of a brake piston housing showing the use of fiber and composite laminate insert blocks to bear loads in the brake components according to an embodiment of the present invention.

Using the brake piston housing in FIG. 2 as an example of the reinforcement component, the fibers or fabric 130 are wound around support tubes 111 at bolt locations 112 surrounding the torque tube 110 and around the outside circumference of the piston chamber 122. The winding around a chamber 122 may process around one or more support tubes 111 to an adjacent chamber or skip any number of chambers before winding the next chamber. The piston chambers 122 are supported at their base by the ring members 22 which are part of the frame 12 in FIG. 1B. Tension in these wound fibers resists any outward radial motion 144 of the piston chamber 122. Any radial inward motion 142 by the piston chamber 122 is resisted by the composite laminate block 134 positioned between the piston cup and support tubes. In a second direction 146 normal to the radial direction a resin impregnated fiber or fabric band 132 wound around all the chambers 122 resists any circumferential 146 movement of the cups by putting the fibers in one direction into tension while the fibers or fabric in the opposite direction would be in compression and provide less support. When the piston forces the brake plates together, a reaction force arises in a third direction 148 normal to radial and circumferential directions just described. This force is resisted by tension in the fibers 133 between an appendage 152 on the piston cup and an appendage 154 on the base plate 114. No corresponding laminate structure is needed because the piston cups do not experience significant compressive forces opposite to the direction 148. In other embodiments this structure could be a gear case with a structural assembly supporting gears or an assembly in an motor housing which supports the motor in resisting torque generated by the drive shaft. The brakes are actuated by pressurized hydraulic fluid which is transmitted to the piston chambers 122 through hydraulic lines 117 from a central ring 115.

An example of transport of force or torque through a housing is given by the torque arm 115 (15 in FIG. 1B) which is a component of the frame 12 in FIG. 1B. This arm 115 transmits torque from the torque tube 110 attached to the aircraft brake disks to the torque arm attachment 117 (17 in FIG. 1B) which connects to the aircraft structure. Because of the high loads, the torque arm is made of metal in this embodiment.

Figure 3:
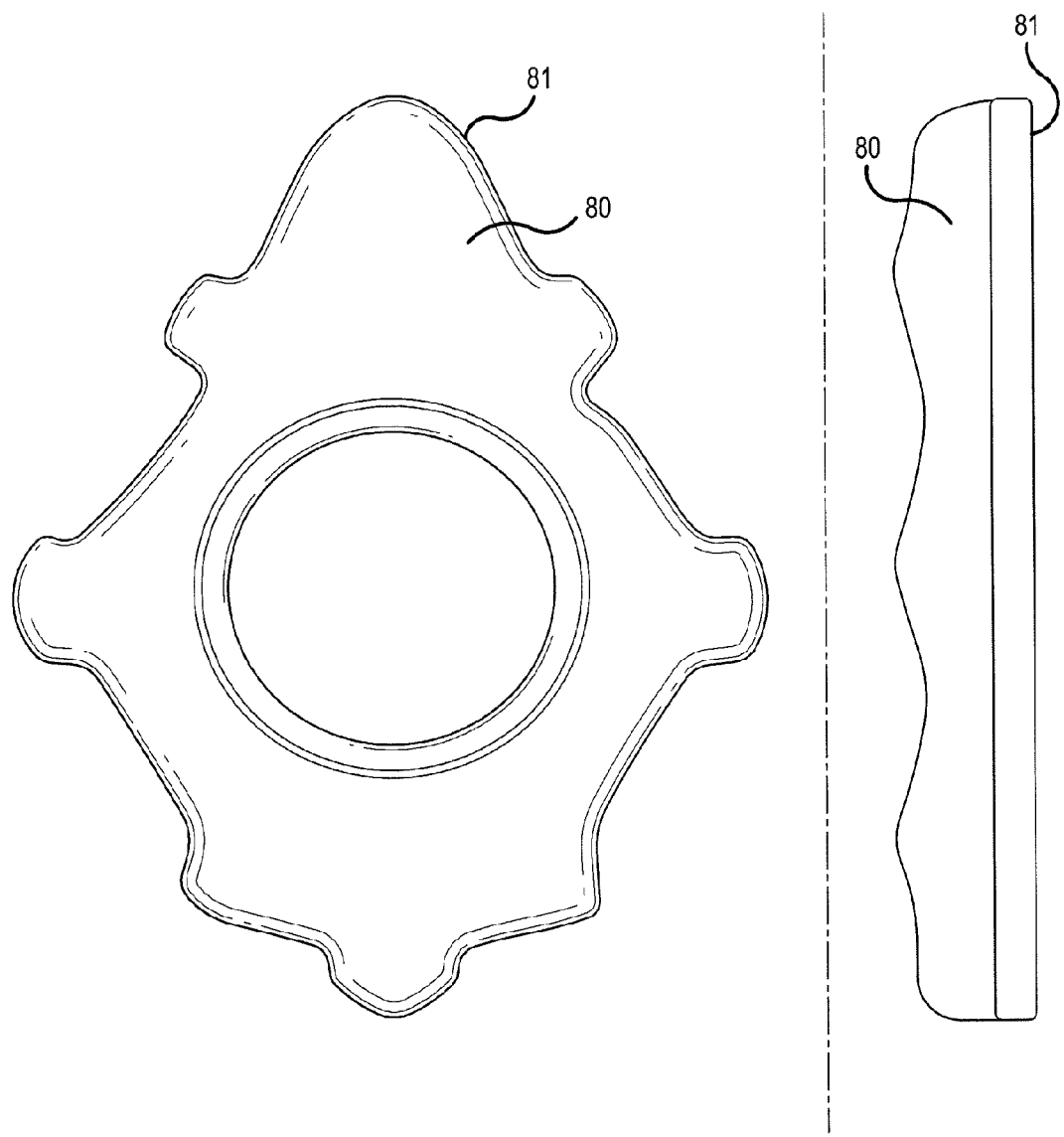
FIG. 3 illustrates an enclosure or top cover for the brake piston housing according to an embodiment of the present invention.

FIG. 3 illustrates a top and side view of an enclosure 80 for the brake piston housing. The enclosure keeps water, aircraft runway fluids, jet fuel and hydraulic fluid from entering the housing. For the brake piston housing the enclosure can be relatively thin and light and made by a molding process. Sealing gaskets may be molded in or applied in a post-processing step along the sealing surface 81 of the enclosure. In the case of an enclosure supporting a shaft, for example in a motor housing embodiment, structural components, as described elsewhere, would need to be bonded into the enclosure. In other embodiments, this enclosure could be a gear case which primarily retains lubricating fluids or a motor housing which primarily protects electrical components from contamination. In some implementations, one or more of the composite reinforcement elements ("blocks") or frame may be located outside of the assembly enclosure.

Figure 4:
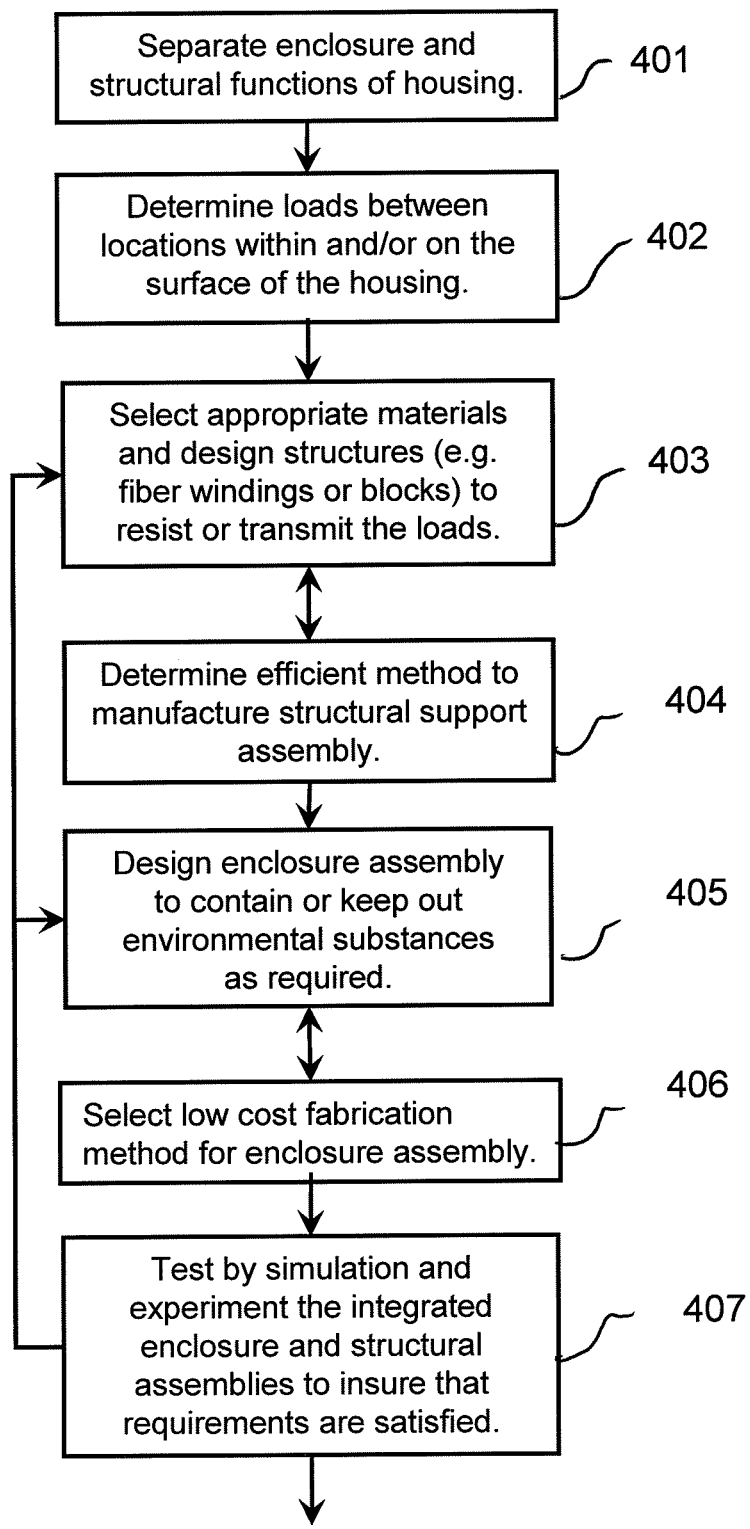
FIG. 4 is a flow diagram for a method of manufacturing an aircraft assembly housing according to an embodiment of the present invention.

FIG. 4 illustrates a method of manufacturing an mechanical assembly housing according to an embodiment of the present invention. In step 401, the housing design is examined to determine which portions perform the enclosure function primarily and which serve as structural members. In step 402 the forces, torques and pressures within or through the walls of the housing are identified and those of sufficient magnitude to require structural reinforcement are called out. Step 403 involves selection of materials and the appropriate light weight composite or metal structure to resist or transmit the loads. Since high performance composite structures can be very expensive, step 404 is to select the most cost effective manufacturing methods. Iteration with step 403 may be required. In step 405 the shapes of the enclosure assembly are determined and the appropriate light weight materials are selected to resist and seal against the environmental substances both inside and external to the enclosure. Step 406 involves selection of low cost fabrication methods, such as molding or stamping, for the enclosure components. Since the enclosure and load bearing functions are designed and optimized separately, step 407 ensures the assembled housing performs to specification.

Figure 5:
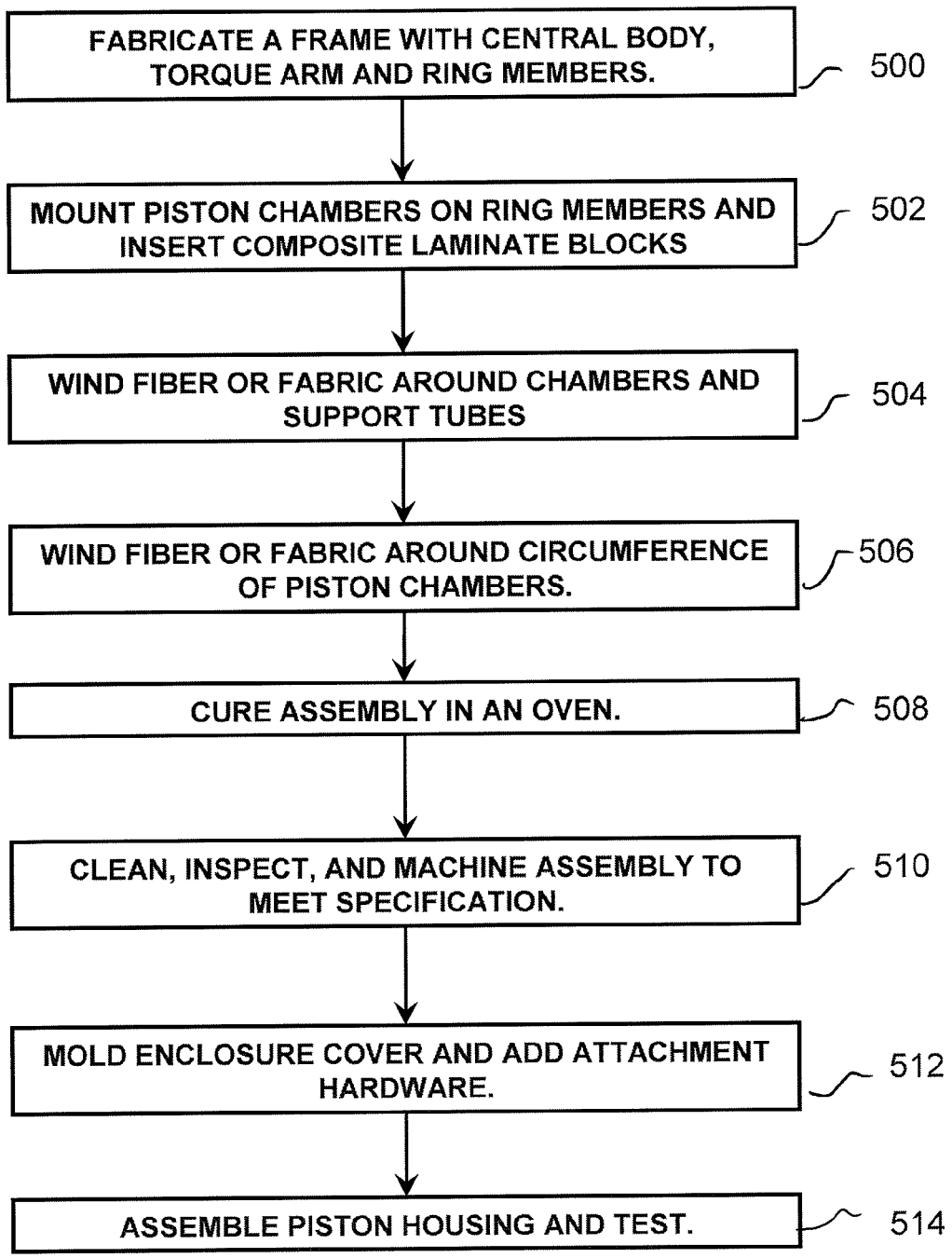
FIG. 5 is a flow diagram illustrating a method of manufacturing a brake piston housing according to an embodiment of the present invention.

FIG. 5 illustrates a method of manufacturing the brake piston housing according to the embodiment shown in FIG. 2. In step 500, a metal frame is fabricated with a central body portion and a plurality of metal frame arms disposed around the central body portion. In step 502 piston chambers are disposed at the ends of the frame arms and composite blocks are inserted.

In step 504, a winding comprised of a fabric or unidirectional carbon fiber preimpregnated with epoxy is wound around the piston chambers and then around the metal enclosures which extend from the bolts on the central body portion. In step 506 the windings 132 are made around the circumference of the piston chambers.

In step 508, the assembly is cured in an oven. Alternatively open areas of the assembly may be filled with metal inserts and the entire assembly placed in a vacuum bag and cured in an autoclave. After curing, the assembly is inspected, cleaned and machined as needed to meet specification in step 510. A composite cover is molded in a separate operation and inspected and any attachment hardware is added in step 512. The composite cover is further described in co-pending U.S. patent application Ser. No. 11/704,239, entitled "Composite Piston Housing For Aircraft Brakes" (the entire contents of which are hereby incorporated by reference). As the final step (514), the piston housing is assembled and tested according to the appropriate protocols.

In another alternative embodiment, the plurality of arms extending from the central body portion is comprised of composite material instead of metal. In another alternative embodiment, dry fiber or fabric is used instead of preimpregnated material for the windings and composite block. The assembly is placed in a mold and resin is introduced by resin transfer molding.

The present invention has been described herein in terms of specific embodiments. Obvious modifications and additions to these embodiments will become apparent to those skilled in the relevant arts upon a reading of the foregoing disclosure. It is intended that all such obvious modifications and additions form a part of this invention to the extent they fall within the scope of the several claims appended hereto.

What is claimed is:

1. An aircraft assembly comprising:
    a structure comprising a plurality of brake piston chambers;
    a frame component configured to support the structure; and
    a reinforcement component comprising at least one winding including at least one reinforcing fiber, wherein the at least one reinforcing fiber is wound around the structure, wherein the reinforcement component is configured to resist radial motion of the plurality of brake piston chambers, wherein the reinforcement component further comprises a composite body, and wherein the frame component is at least partially embedded in the composite body.

2. The aircraft assembly of claim 1, wherein the reinforcement component further comprises a composite block positioned proximate to the structure and configured to resist radial motion of at least one brake piston chamber of the plurality of brake piston chambers.

3. The aircraft assembly of claim 2, wherein the structure comprises a first structure comprising the plurality of brake piston chambers, the assembly further comprising a second structure, wherein the at least one winding is wound around the first structure and the second structure and the composite block is positioned proximate to and between the first structure and the second structure, wherein the winding and the composite block are configured to resist tension and compression on the first structure and the second structure.

4. The aircraft assembly of claim 1, wherein the at least one winding is oriented such that the reinforcement component resists radial motion of at least one brake piston chamber of the plurality of brake piston chambers in up to three orthogonal directions.

5. The aircraft assembly of claim 1, wherein the frame component is formed of a first material, the aircraft assembly further comprising an enclosure component configured to protect functional components of the aircraft assembly from external conditions, wherein the enclosure component is formed of a second material having a lower density than the first material.

6. The aircraft assembly of claim 5, wherein the first material comprises metal and the second material comprises a composite material.

7. The aircraft assembly of claim 5, wherein the enclosure component includes a plurality of molded shells sealed to one another.

8. The aircraft assembly of claim 5, wherein the enclosure component comprises carbon fiber.

9. The aircraft assembly of claim 1, wherein the at least one reinforcing fiber comprises fabric or unidirectional carbon fiber preimpregnated with epoxy.

10. A method of manufacturing an aircraft assembly, the method comprising:
    fabricating a frame component configured to support a structure comprising a plurality of brake piston chambers;
    mounting the structure on the frame component;
    winding a reinforcing fiber of at least one winding of a reinforcement component around the structure, wherein the reinforcement component is configured to resist radial motion of the plurality of brake piston chambers, and wherein the reinforcement component further comprises a composite body; and
    at least partially embedding the frame component in the composite body.

11. The method of claim 10, further comprising inserting a composite block proximate to the structure, wherein the composite block is configured to resist radial motion of at least one brake piston chamber of the plurality of brake piston chambers.

12. The method of claim 10, wherein the structure is configured to support gears or a motor.

13. The method of claim 10, wherein fabricating the frame component comprises fabricating a frame component from a first material, the method further comprising molding an enclosure component from a second material, wherein the enclosure component is configured to protect functional components of the aircraft assembly from external conditions, and wherein the second material has a lower density than the first material.

14. An aircraft brake piston housing comprising:
   a frame comprising a plurality of circumferentially disposed openings surrounding a central bore; and
   a reinforcement component comprising a composite body and a plurality of windings, each winding of the plurality of windings comprising at least one reinforcing fiber wound circumferentially around at least one of the circumferentially disposed openings, wherein the frame is at least partially embedded in the composite body.

15. The aircraft brake piston housing of claim 14, wherein the plurality of windings comprises fabric or unidirectional carbon fiber preimpregnated with epoxy.

16. The aircraft brake piston housing of claim 14, further comprising a plurality of composite blocks configured to resist compressive loads applied to the housing.

* * * * *